United States Patent
Lambourne et al.

(10) Patent No.: US 7,571,014 B1
(45) Date of Patent: Aug. 4, 2009

(54) METHOD AND APPARATUS FOR CONTROLLING MULTIMEDIA PLAYERS IN A MULTI-ZONE SYSTEM

(75) Inventors: Robert A. Lambourne, Santa Barbara, CA (US); Nicholas A. J. Millington, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 1091 days.

(21) Appl. No.: 10/861,653

(22) Filed: Jun. 5, 2004

Related U.S. Application Data

(63) Continuation-in-part of application No. 10/816,217, filed on Apr. 1, 2004.

(51) Int. Cl.
G06F 17/00 (2006.01)
G06F 3/00 (2006.01)

(52) U.S. Cl. .......................... 700/94; 715/716
(58) Field of Classification Search ................ 700/94; 715/716, 734, 735; 709/220, 221; 381/56
See application file for complete search history.

(56) References Cited

U.S. PATENT DOCUMENTS

| | | | |
|---|---|---|---|
| 5,239,458 A * | 8/1993 | Suzuki ..................... 700/83 |
| 5,299,266 A * | 3/1994 | Lumsden ................... 381/119 |
| 5,751,819 A * | 5/1998 | Dorrough .................... 381/56 |
| 7,218,708 B2 * | 5/2007 | Berezowski et al. .......... 379/37 |
| 2002/0109710 A1 * | 8/2002 | Holtz et al. .................. 345/723 |
| 2002/0124097 A1 * | 9/2002 | Isely et al. ................... 709/231 |
| 2002/0188762 A1 * | 12/2002 | Tomassetti et al. .......... 709/251 |
| 2003/0126211 A1 * | 7/2003 | Anttila et al. ............... 709/205 |
| 2004/0008852 A1 * | 1/2004 | Also et al. ................... 381/119 |
| 2004/0252400 A1 * | 12/2004 | Blank et al. .................. 360/70 |
| 2005/0047605 A1 * | 3/2005 | Lee et al. ...................... 381/56 |
| 2007/0038999 A1 * | 2/2007 | Millington ................... 718/100 |

* cited by examiner

Primary Examiner—Curtis Kuntz
Assistant Examiner—Daniel R Sellers
(74) Attorney, Agent, or Firm—Joe Zheng

(57) ABSTRACT

Techniques for controlling zone group and zone group characteristics such as audio volume in a multi-zone system are disclosed. The multi-zone system includes a number of multimedia players, each preferably located in a zone. A controller may control the operations of all of the zone players remotely from any one of the zones. Two or more zone players may be dynamically grouped as a zone group for synchronized operations. According to one aspect of the techniques, a zone group configuration can be managed, updated, modified via an interactive user interface provided in a controlling device. The zone group configuration may be saved in one of zone players. According to another aspect of the techniques, the audio volume control of a zone group can be performed individually or synchronously as a group.

44 Claims, 14 Drawing Sheets

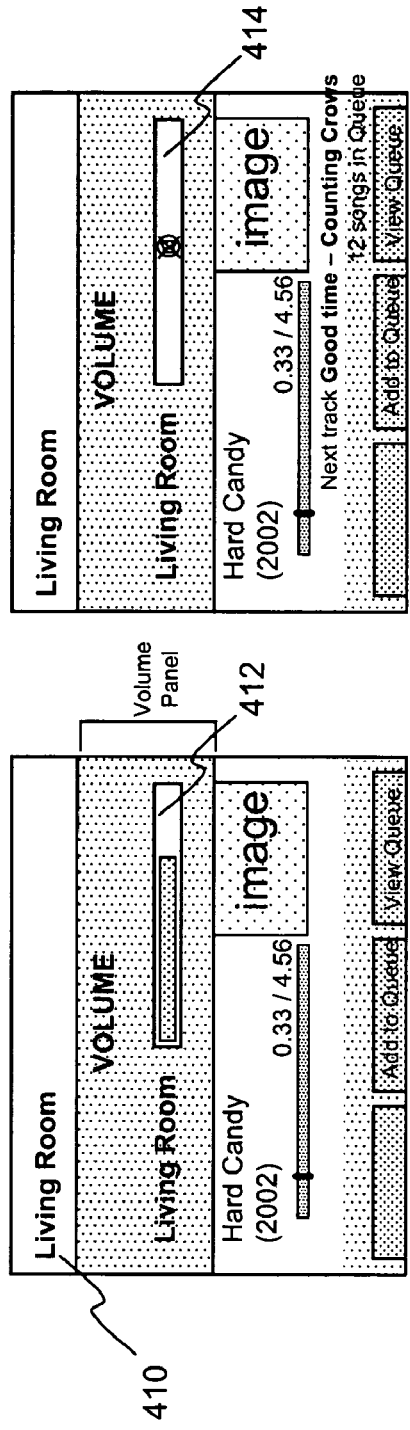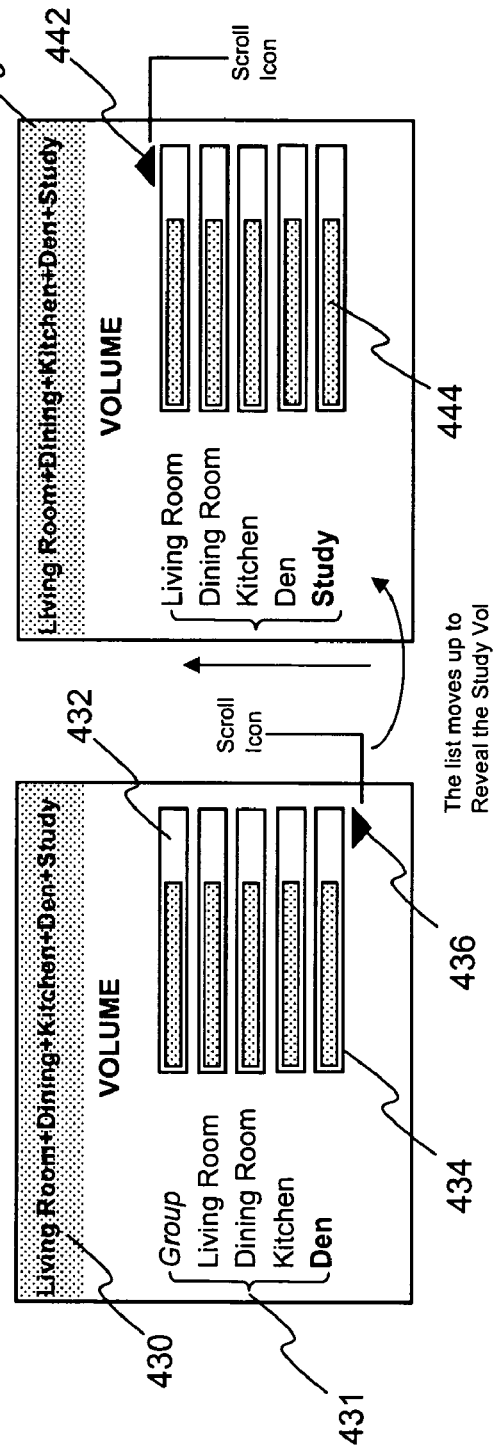
FIG. 4A
FIG. 4B

METHOD AND APPARATUS FOR CONTROLLING MULTIMEDIA PLAYERS IN A MULTI-ZONE SYSTEM

CROSS-REFERENCE TO RELATED APPLICATION

This application is a continuation-in-part of U.S. patent application Ser. No. 10/816,217, filed Apr. 1, 2004, in the name of Nicholas A. J. Millington, and entitled "System and method for synchronizing operations among a plurality of independently clocked digital data processing devices" filed on Apr. 1, 2004.

BACKGROUND OF THE INVENTION

1. Field of the Invention

The invention is generally related to the area of audio technologies and human-computer interaction. In particular, the invention is related to method and apparatus for controlling or manipulating a plurality of multimedia players in a multi-zone system.

2. The Background of Related Art

An enduring passion for quality audio reproduction or system is continuing to drive demands from users. One of the demands includes an audio system in a house in which, for example, one could grill to classic rock on a patio while another one may cook up his/her own music selections in a kitchen. This is all at the same time while a teenager catches a ballgame in a family room, and another one blasts pop in a bedroom. And the best part of such audio system is that each family member does not need his or her own stereo system— one system gives everyone access to all the music sources.

Currently, one of the systems that can meet part of such demand is a conventional multi-zone audio system that usually includes a number of audio players. Each of the audio players has its own amplifier(s) and a set of speakers and typically installed in one place (e.g., a room). In order to play an audio source at one location, the audio source must be provided locally or from a centralized location. When the audio source is provided locally, the multi-zone audio system functions as a collection of many stereo systems, making source sharing difficult. When the audio source is provided centrally, the centralized location may include a juke box, many compact discs, an AM or FM radio, tapes, or others. To send an audio source to an audio player demanding such source, a cross-bar type of device is used to prevent the audio source from going to other audio players that may be playing other audio sources.

In order to achieve playing different audio sources in different audio players, the traditional multi-zone audio system is generally either hard-wired or controlled by a pre-configured and pre-programmed controller. While the pre-programmed configuration may be satisfactory in one situation, it may not be suitable for another situation. For example, a person would like to listen to broadcast news from his/her favorite radio station in a bedroom, a bathroom and a den while preparing to go to work in the morning. The same person may wish to listen in the den and the living room to music from a compact disc in the evening. In order to satisfy such requirements, two groups of audio players must be established. In the morning, the audio players in the bedroom, the bathroom and the den need to be grouped for the broadcast news. In the evening, the audio players in the den and the living room are grouped for the music. Over the weekend, the audio players in the den, the living room, and a kitchen are grouped for party music. Because the morning group, the evening group and the weekend group contain the den, it can be difficult for the traditional system to accommodate the requirement of dynamically managing the ad hoc creation and deletion of groups.

Other than the above mentioned problem, the control of the audio players as a group does not exist. For example, the audio volume of the audio players in the traditional multi-zone audio system needs to be adjusted one at a time, resulting in an inconvenient and non-homogenous audio environment.

There is, therefore, a need for solutions in a multi-zone audio system to control a plurality of audio players and their audio characteristics from one controlling device.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to control of audio characteristics of a plurality of multimedia players, or simply players, from a controller. The characteristics include, but are not limited to, an audio source and an audio volume being played in each of the players. In particular, the present invention enables the user to remotely control the audio characteristics of the players either as a group or as an individual player. According to one aspect of the present invention, the same audio source is selected to be played synchronously in a group of players via a controlling device operated by a user. The group may be flexibly formed in a dynamic manner. Within the group, any one of the audio sources may be chosen and made available to each of the players. All audio playback control operations such as pause/play, forward/rewind, next/previous track are synchronously controlled, while the audio volume adjustment may be applied to a selected player or all of the players in the group.

According to another aspect of the present invention, a configurable module is implemented in the controlling device that provides interactive graphic user interface for controlling playback of the audio source, grouping a plurality of players together, de-grouping a group or adjusting audio volume of individual players or a group of players.

According to yet another aspect of the present invention, a player in a group of players is configured to synchronously play an audio source by selecting a source, making the source available or retrieving the source if the source is not found locally The present invention may be implemented in many forms including software, hardware or a combination of both. According to one embodiment, the present invention is directed to a method for controlling a plurality of players, the method comprising: displaying on a screen a first list showing at least available players, selecting at least one of the players as a zone group head, displaying on the screen a second list showing at least some of the players that are eligible to be grouped with the zone group head, selecting one or more players from the at least some of the players to be a group being formed by the group head, and synchronizing all players in the group.

According to another embodiment, the present invention is a method for controlling a plurality of players, the method comprising displaying on a screen a list showing a plurality of volume meters, at least one of the volume meters representing an audio volume of one of the players, and another one of the volume meters representing an audio volume of a group of players, if there is such group, selecting one of the volume meters from the list, and adjusting the one of the volume meters as desired.

According to still another embodiment, the present invention is an apparatus for controlling a plurality of players, the apparatus comprises a screen, a screen driver commanding the screen, an input interface, a network interface, a memory for storing code for an application module, a processor coupled to the memory, the input interface, the screen driver and the network interface, the processor executing the code in the memory to cause the application module and the screen driver to perform operations of: displaying on the screen a first list showing at least available players; selecting at least one of the players as a zone group head; displaying on the screen a second list showing at least some of the players that are eligible to be grouped with the zone group head; selecting one or more players from the at least some of the players to be a zone group being formed by the zone group head; and synchronizing all players in the zone group.

The operations further include displaying on a screen a list showing a plurality of volume meters, at least one of the volume meters representing an audio volume of one of the players, and another one of the volume meters representing an audio volume of a group of players, if there is such group; selecting one of the volume meters from the list; and adjusting the one of the volume meters as desired.

One of the objects, features, and advantages of the present invention is to remotely control a plurality of multimedia players in a multi-zone system, playing and controlling the audio source synchronously if the players are grouped together, or playing and controlling the audio source individually if the players are disassociated with each other.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIGS. 4A and 4B show a sequence of screen displays in accordance with one embodiment of the present invention for controlling players regarding audio volume;

DETAILED DESCRIPTION OF THE PREFERRED EMBODIMENT

The present invention pertains to techniques for controlling a plurality of players, grouping some of the players, manipulating audio characteristics of the players individually or in groups. The audio characteristics include, but are not limited to, audio volume, audio bass, and audio treble. The players, also referred to as zone players, are part of in a multi-zone system that may be installed in a complex with multiple zones. In general, each zone player is located in one of the zones. Each of the zone players in the multi-zone system is coupled to a data network to communicate not only with each other but with other devices. According to one aspect of the present invention, through a controlling device, not only can each of the zone players be individually controlled, but also two or more of the zone players may be grouped as one or more groups and controlled as if they were a single unit. The audio playback for the zone players in a zone group can be synchronized.

According to another aspect of the techniques, a zone group configuration can be manipulated via a user interface provided in a controlling device. The user interface provides a mechanism to manage, create, delete or modify zone groups. All audio playback operations, such as pause/play, forward/rewind, next/previous track, are synchronized for the zone players in a zone group. The zone group configuration may be saved in any one of zone players for easy retrieval in any of the zones at anytime.

The detailed description of the present invention is presented largely in terms of procedures, steps, logic blocks, processing, or other symbolic representations that directly or indirectly resemble the operations of devices or systems that can be used on networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1:
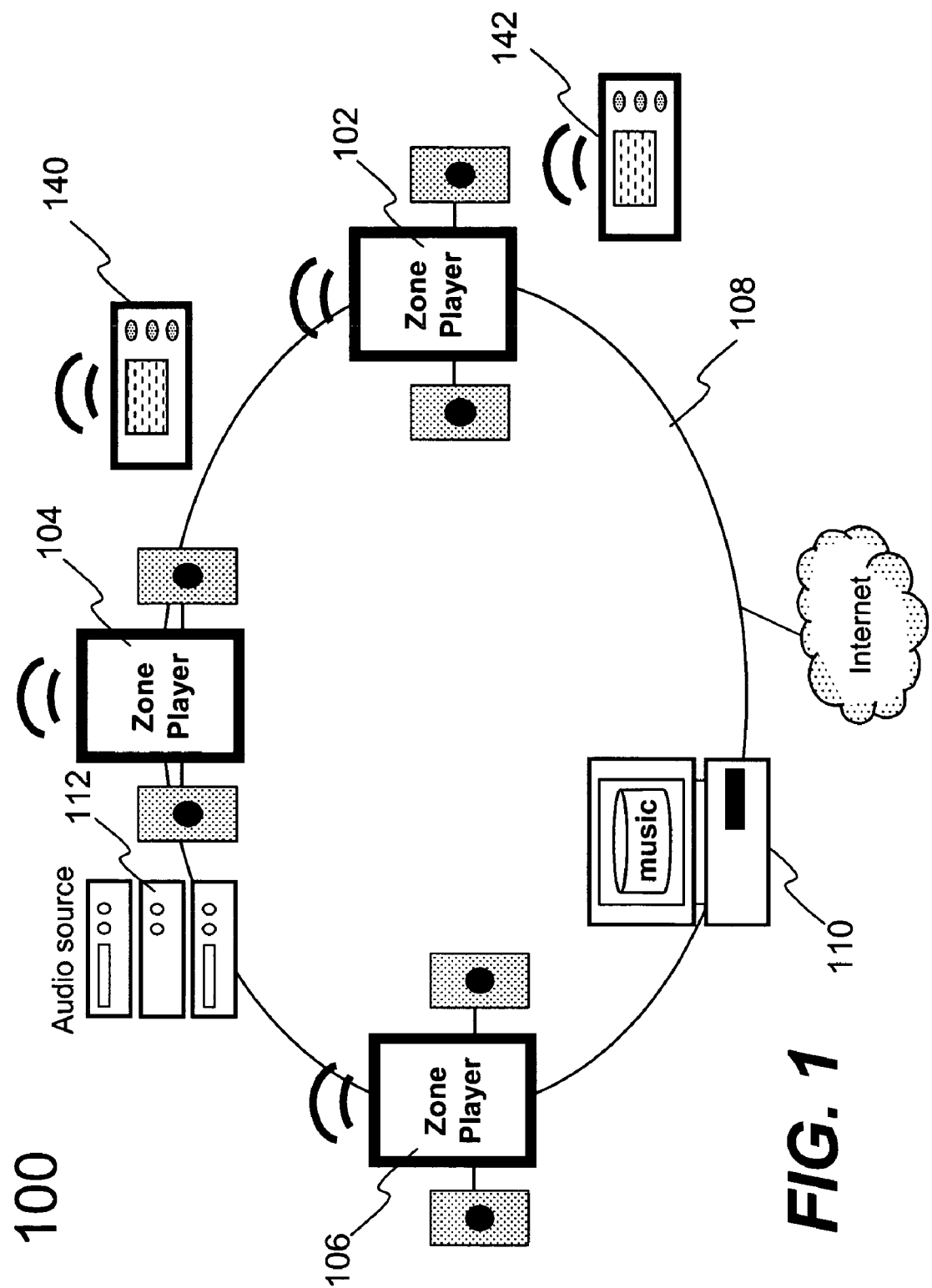
FIG. 1 shows an exemplary configuration in which the present invention may be practiced.

Referring now to the drawings, in which like numerals refer to like parts throughout the several views. FIG. 1 shows an exemplary configuration 100 in which the present invention may be practiced. The configuration may represent, but not be limited to, a part of a residential home, a business building or a complex with multiple zones. There are a number of multimedia players of which three examples 102, 104 and 106 are shown as audio devices. Each of the audio devices may be installed or provided in one particular area or zone and hence referred to as a zone player herein.

As used herein, unless explicitly stated otherwise, an audio source or audio sources are in digital format and can be transported or streamed over a data network. To facilitate the understanding of the present invention, it is assumed that the configuration 100 represents a home. Thus, the zone player 102 and 104 may be located in two of the bedrooms respectively while the zone player 106 may be installed in a living room. All of the zone players 102, 104 and 106 are coupled directly or indirectly to a data network 108. In addition, a computing device 110 is shown to be coupled on the network 108. In reality, any other devices such as a home gateway device, a storage device, or an MP3 player may be coupled to the network 108 as well.

The network 108 may be a wired network, a wireless network or a combination of both. In one example, all devices including the zone players 102, 104 and 106 are coupled to the network 108 by wireless means based on an industry standard such as IEEE 802.11. In yet another example, all devices including the zone players 102, 104 and 106 are part of a local area network that communicates with a wide area network (e.g., the Internet).

Many devices on the network 108 are configured to download and store audio sources. For example, the computing device 110 can download audio sources from the Internet and store the downloaded sources locally for sharing with other devices on the Internet or the network 108. The computing device 110 can also be configured to receive streaming audio. Shown as a stereo system, the device 112 is configured to receive an analog audio source (e.g., from broadcasting) or retrieve a digital audio source (e.g., from a compact disk). The analog audio sources can be converted to digital audio sources. In accordance with the present invention, the audio source may be shared among the devices on the network 108.

Two or more zone players may be grouped together to form a new zone group. Any combinations of zone players and an existing zone group may be grouped together. In one instance, a new zone group is formed by adding one zone player to another zone player or an existing zone group. A first chosen zone player to form the new zone group may be referred to as a zone group head. Depending on implementation, all other zone players in the group are synchronized to play an audio source or a queue of sources being played or provided by the zone group head or any one zone player in the group may be selected to synchronize others. For example, when the zone player 106 is added to the zone player 102 to form a new zone group, the zone players 102 is the zone group head of the new zone group. Both players will synchronously playback audio sources that are accessible to any one of the zone players in the multi-zone system. In one embodiment, the audio source being played or provided by the zone player 102 will be also played in the zone player 106. In another embodiment, the audio source being played or provided by the newly added zone player 106 will be played in all players in the group.

In spite of an existing zone group including the zone players 102 or 106, it is still possible to add another zone player (e.g., player 104) to the existing zone group containing the zone players 102 and 106. In one embodiment, when this zone group is selected to play an audio source, the zone players 102 and 106 will synchronize with the zone player 104, playing whatever the zone player 104 is playing or ready to play. In another embodiment, when this zone group is selected to play an audio source, the zone player 104 will synchronize with the zone players 102 and 106, playing whatever the zone players 102 and 106 are playing or ready to play. In an exemplary deployment, a zone group includes the zone players 102, 104 and 106 located in a bedroom, a kitchen and a bathroom of a house, respectively. When an audio source is played in the zone group, the playback is synchronized among the zone players 102, 104 and 106 in the group. As a result, a user may hear the same music or song regardless of whether the user is in the bedroom, the kitchen or the bathroom.

Many devices on the network 108 may be configured to control operations of the zone players 102, 104 and 106. In particular, one or more controlling devices 140 and 142 are used to control zone players 102, 104 and 106 as shown in FIG. 1. The controlling devices 140 and 142 are preferably portable and remotely control the zone players via wireless means (e.g., infrared, radio, wireless standard IEEE 802.11b or 802.11g). In one embodiment, besides controlling an individual zone player, the controlling device 140 or 142 is configured to manage audio sources and audio characteristics of all the zone players regardless where the controlling device 140 or 142 is located in a house or a confined complex.

Figure 2A:
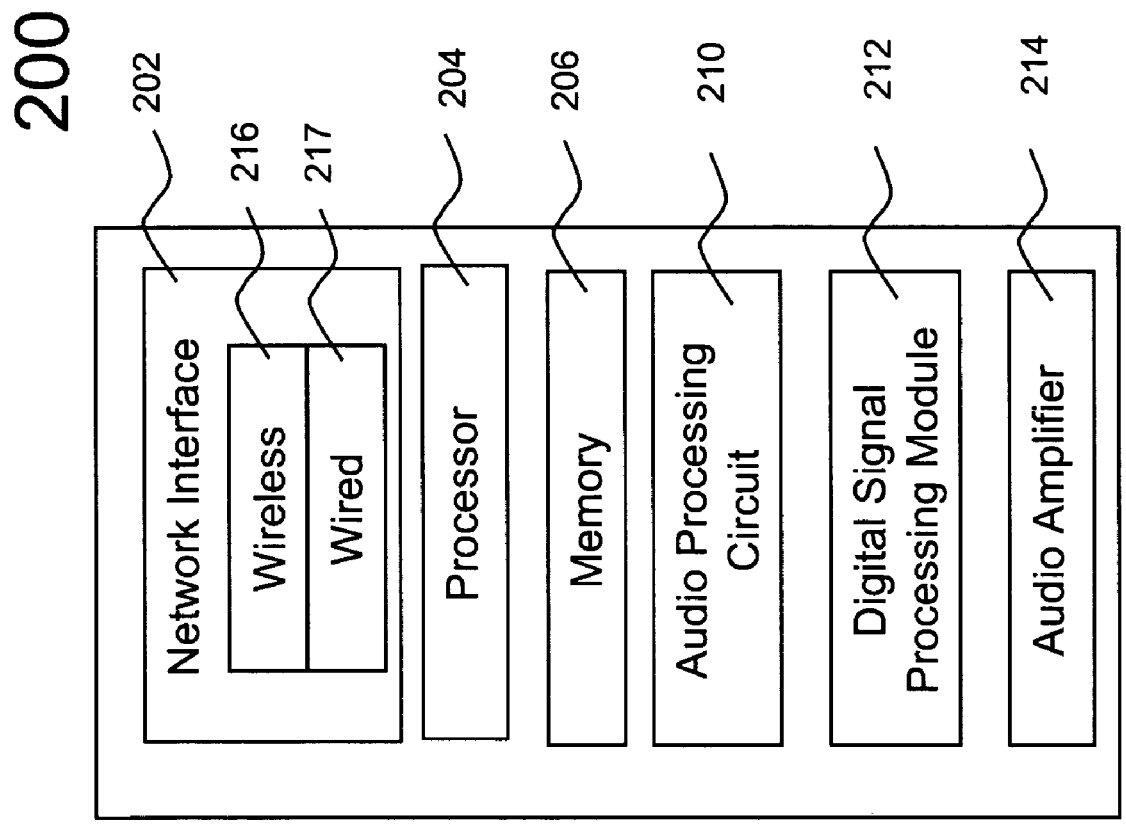
FIG. 2A shows an exemplary functional block diagram of a player in accordance with the present invention.

Referring now to FIG. 2A, there is shown an exemplary functional block diagram of a zone player 200 in accordance with the present invention. The zone player 200 includes a network interface 202, a processor 204, a memory module 206, an audio processing circuit 210, a digital signal processing module 212, an audio amplifier 214 and a RF interface 216. The network interface 202 facilitates a data flow between a data network (i.e., the data network 108 of FIG. 1) and the zone player 200 and typically executes a special set of rules (i.e., a protocol) to send data back and forth. One of the common protocols is TCP/IP (Transmission Control Protocol/Internet Protocol) commonly used in the Internet. In general, a network interface manages the assembling of an audio source or file into smaller packets that are transmitted over the data network or reassembles received packets into the original source or file. In addition, the network interface 202 handles the address part of each packet so that it gets to the right destination or intercepts packets destined for the zone player 200.

The network interface 202 may include one or both of a wireless interface 216 and a wired interface 217. The wireless interface 216, also referred to as a RF interface, provides network interface functions by a wireless means for the zone player 200 to communicate with other devices in accordance with a communication protocol (such as the wireless standard IEEE 802.11a, 802.11b or 802.11g). The wired interface 217 provides network interface functions by a wired means (e.g., an Ethernet cable). In one embodiment, a zone player, referred to as an access zone player, includes both of the interfaces 216 and 217, and other zone players include only the RF interface 216. Thus these other zone players communicate with other devices on a network or retrieve audio sources via the access zone player. The processor 204 is configured to control the operation of other parts in the zone player 200. The memory 206 may be loaded with one or more software modules that can be executed by the processor 204 to achieve desired tasks. According to one aspect of the present invention, a software module implementing one embodiment of the present invention is executed, the processor 204 operates in accordance with the software module in reference to a saved zone group configuration characterizing a zone group created by a user, the zone player 200 is caused to retrieve an audio source from another zone player or a device on the network.

According to one embodiment of the present invention, the memory 206 is used to save one or more saved zone configuration files that may be retrieved for modification at any time. Typically, a saved zone group configuration file is transmitted to a controller (e.g., the controlling device 140 or 142 of FIG. 1) when a user operates the controlling device. The zone group configuration provides an interactive user interface so that various manipulations or control of the zone players may be performed.

The audio processing circuit 210 resembles most of the circuitry in an audio playback device and includes one or more digital-to-analog converters (DAC), an audio preprocessing part, an audio enhancement part or a digital signal processor and others. In operation, when an audio source is retrieved via the network interface 202, the audio source is processed in the audio processing circuit 210 to produce analog audio signals. The processed analog audio signals are then provided to the audio amplifier 214 for playback on speakers. In addition, the audio processing circuit 210 may include necessary circuitry to process analog signals as inputs to produce digital signals for sharing with other devices on a network.

Depending on an exact implementation, the digital signal processing module 212 may be implemented within the audio processing circuit 210 or as a combination of hardware and software. The audio amplifier 214 is typically an analog circuit that powers the provided analog audio signals to drive one or more speakers.

Figure 2B:
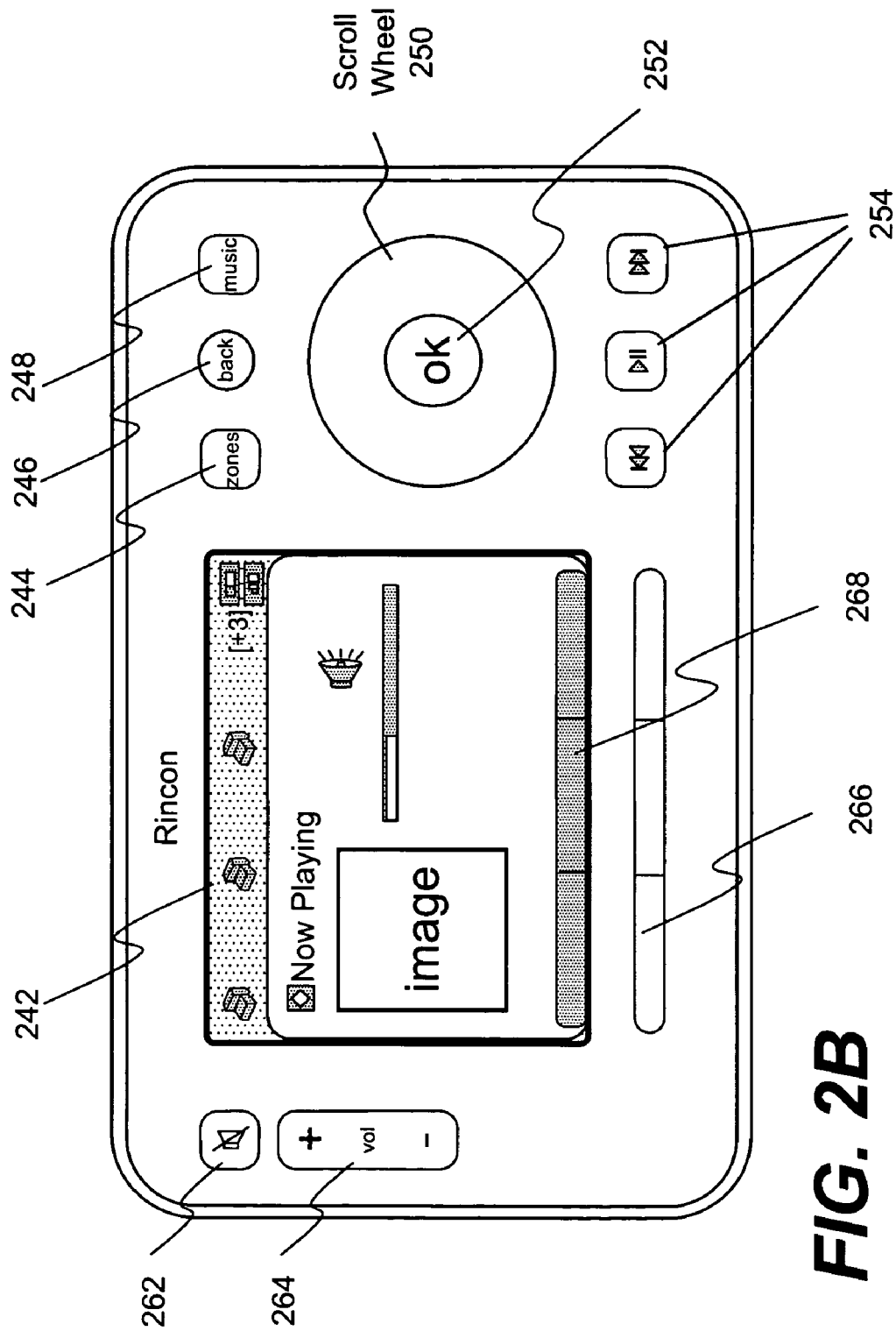
FIG. 2B shows an example of a controller that may be used to remotely control one of more players of FIG. 2A.

Referring now to FIG. 2B, there is shown an example of a controller 240, which may correspond to the controlling device 140 or 142 of FIG. 1. The controller 240 may be used to facilitate the control of multi-media applications, automation and others in a complex. In particular, the controller 240 is configured to facilitate a selection of a plurality of audio sources available on the network, controlling operations of one or more zone players (e.g., the zone player 200) through a RF interface corresponding to the RF interface 216 of FIG. 2A. According to one embodiment, the wireless means is based on an industry standard (e.g., infrared, radio, wireless standard IEEE 802.11a, 802.11b or 802.11g). When a particular audio source is being played in the zone player 200, a picture, if there is any, associated with the audio source may be transmitted from the zone player 200 to the controller 240 for display. In one embodiment, the controller 240 is used to synchronize more than one zone players by grouping the zone players in a group. In another embodiment, the controller 240 is used to control the volume of each of the zone players in a zone group individually or together.

The user interface for the controller 240 may include some of a screen 242 (e.g., a LCD screen) and a set of functional buttons as follows: a "zones" button 244, a "back" button 246, a "music" button 248, a scroll wheel 250, "ok" button 252, a set of transport control buttons 254, a mute button 262, a volume up/down button 264, a set of soft buttons 266 corresponding to the labels 268 displayed on the screen 242.

The screen 242 displays various screen menus in response to a user's selection. In one embodiment, the "zones" button 244 activates a zone management screen or "Zone Menu", which is described in more details below. The "back" button 246 may lead to different actions depending on the current screen. In one embodiment, the "back" button triggers the current screen display to go back to a previous one. In another embodiment, the "back" button negates the user's erroneous selection. The "music" button 248 activates a music menu, which allows the selection of an audio source (e.g., a song) to be added to a zone player's music queue for playback.

The scroll wheel 250 is used for selecting an item within a list, whenever a list is presented on the screen 242. When the items in the list are too many to be accommodated in one screen display, a scroll indicator such as a scroll bar or a scroll arrow is displayed beside the list. When the scroll indicator is displayed, a user may rotate the scroll wheel 250 to either choose a displayed item or display a hidden item in the list. The "ok" button 252 is use to confirm the user selection on the screen 242.

There are three transport buttons 254, which are used to control the effect of the currently playing song. For example, the functions of the transport buttons may include play/pause and forward/rewind a song, move forward to a next song track, or move backward to a previous track. According to one embodiment, pressing one of the volume control buttons such as the mute button 262 or the volume up/down button 264 activates a volume panel. More detailed description of the volume panel will be discussed below. In addition, there are three soft buttons 266 that can be activated in accordance with the labels 268 on the screen 242. It can be understood that, in a multi-zone system, there may be multiple audio sources being played. The music transport functions described herein shall apply selectively to one of the sources when a corresponding one of the zone players or zone groups is selected.

Figure 2C:
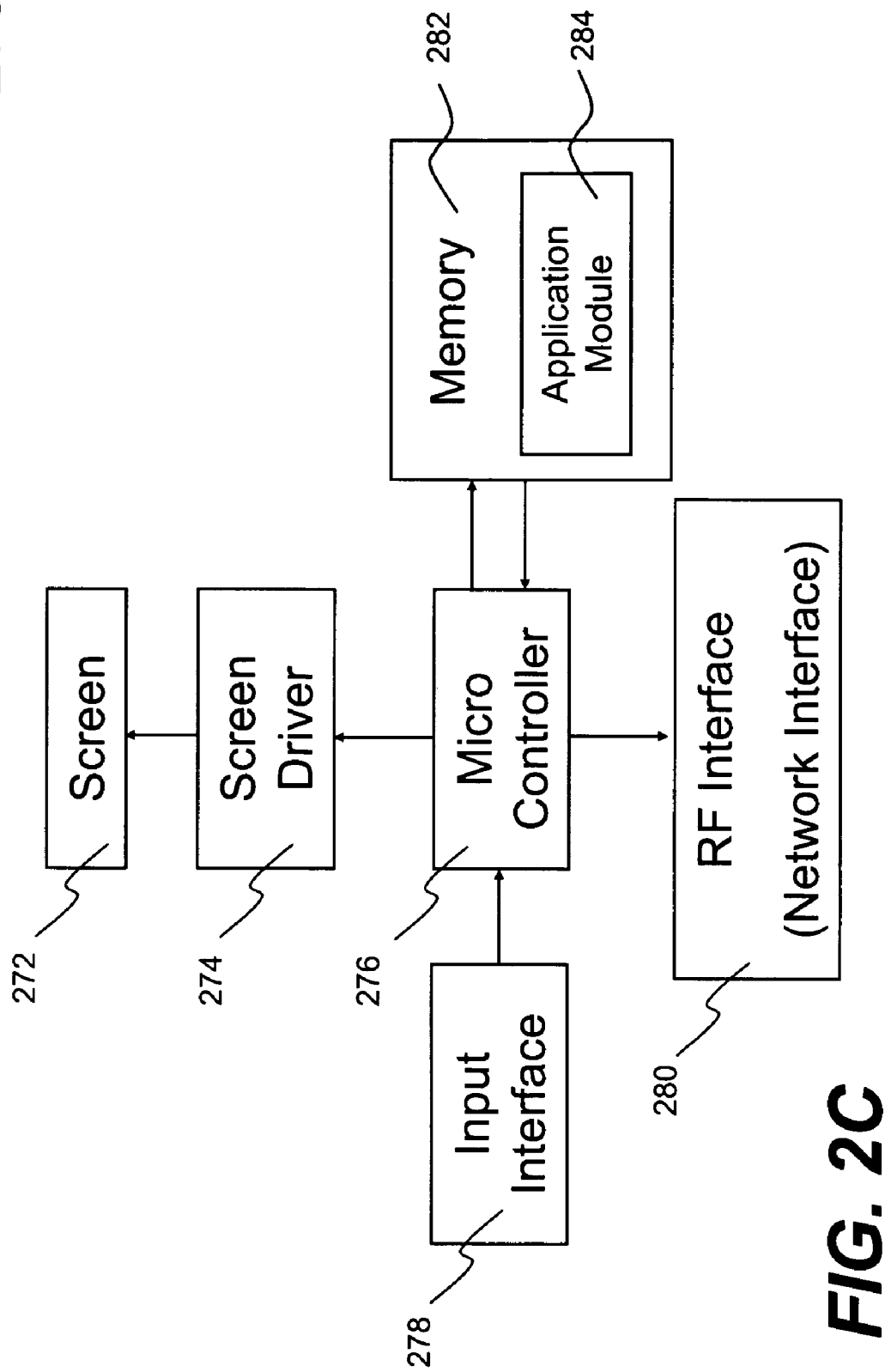
FIG. 2C shows an exemplary internal functional block diagram of a controller in accordance with one embodiment of the present invention.

FIG. 2C illustrates an internal functional block diagram of an exemplary controller 270, which may correspond to the controller 240 of FIG. 2B. The screen 272 on the controller 270 may be a LCD screen. The screen 272 communicates with and is commanded by a screen driver 274 that is controlled by a microcontroller (e.g., a processor) 276. The memory 282 may be loaded with one or more application modules 284 that can be executed by the microcontroller 276 with or without a user input via the user interface 278 to achieve desired tasks. In one embodiment, an application module is configured to facilitate grouping a number of selected zone players into a zone group and synchronizing the zone players for one audio source. In another embodiment, an application module is configured to control together the audio volumes of the zone players in a zone group. In operation, when the microcontroller 276 executes one of the application modules 284, the screen driver 274 generates control signals to drive screen 272 to display an application specific user interface accordingly, more of which will be described below.

The controller 270 includes a network interface 280 referred to as a RF interface 280 that facilitates wireless communication with a zone player via a corresponding RF interface thereof. In one embodiment, the commands such as volume control and audio playback synchronization are sent via the RF interfaces. In another embodiment, a saved zone group configuration is transmitted between a zone player and a controller via the RF interfaces. The controller 270 may control one or more zone players, such as 102, 104 and 106 of FIG. 1. Nevertheless, there may be more than one controllers, each in a zone (e.g., a room) and configured to control any one and all of the zone players.

In one embodiment, a user creates a zone group including at least two zone players from the controller 240 that sends signals or data to one of the zone players. As all the zone players are coupled on a network, the received signals in one zone players can cause other zone players in the group to be synchronized so that all the zone players in the group playback an identical audio source or a list of identical audio sources. Similarly, when a user increases the audio volume of the group from the controller, the signals or data of increasing the audio volume for the group are sent to one of the zone players and causes other zone players in the group to be increased together in volume and in same scale.

According to one implementation, an application module is loaded in memory 282 for zone group management. When a predetermined key (e.g. the "zones" button 244) is activated on the controller 240, the application module is executed in the microcontroller 276. The input interface 278 coupled to and controlled by the microcontroller 276 receives inputs from a user. A "Zone Menu" is then displayed on the screen 272. The user may start grouping zone players into a zone group by activating a "Link Zones" or "Add Zone" soft button, or de-grouping a zone group by activating an "Unlink Zones" or "Drop Zone" button. The detail of the zone group manipulation will be further discussed below.

As described above, the input interface 278 includes a number of function buttons as well as a screen graphical user interface. It should be pointed out that the controller 240 in FIG. 2B is not the only controlling device that may practice the present invention. Other devices that provide the equivalent control functions (e.g., a computing device, a hand-held device) may also be configured to practice the present invention. In the above description, unless otherwise specifically described, it is clear that keys or buttons are generally referred to as either the physical buttons or soft buttons, enabling a user to enter a command or data.

Figure 3A:
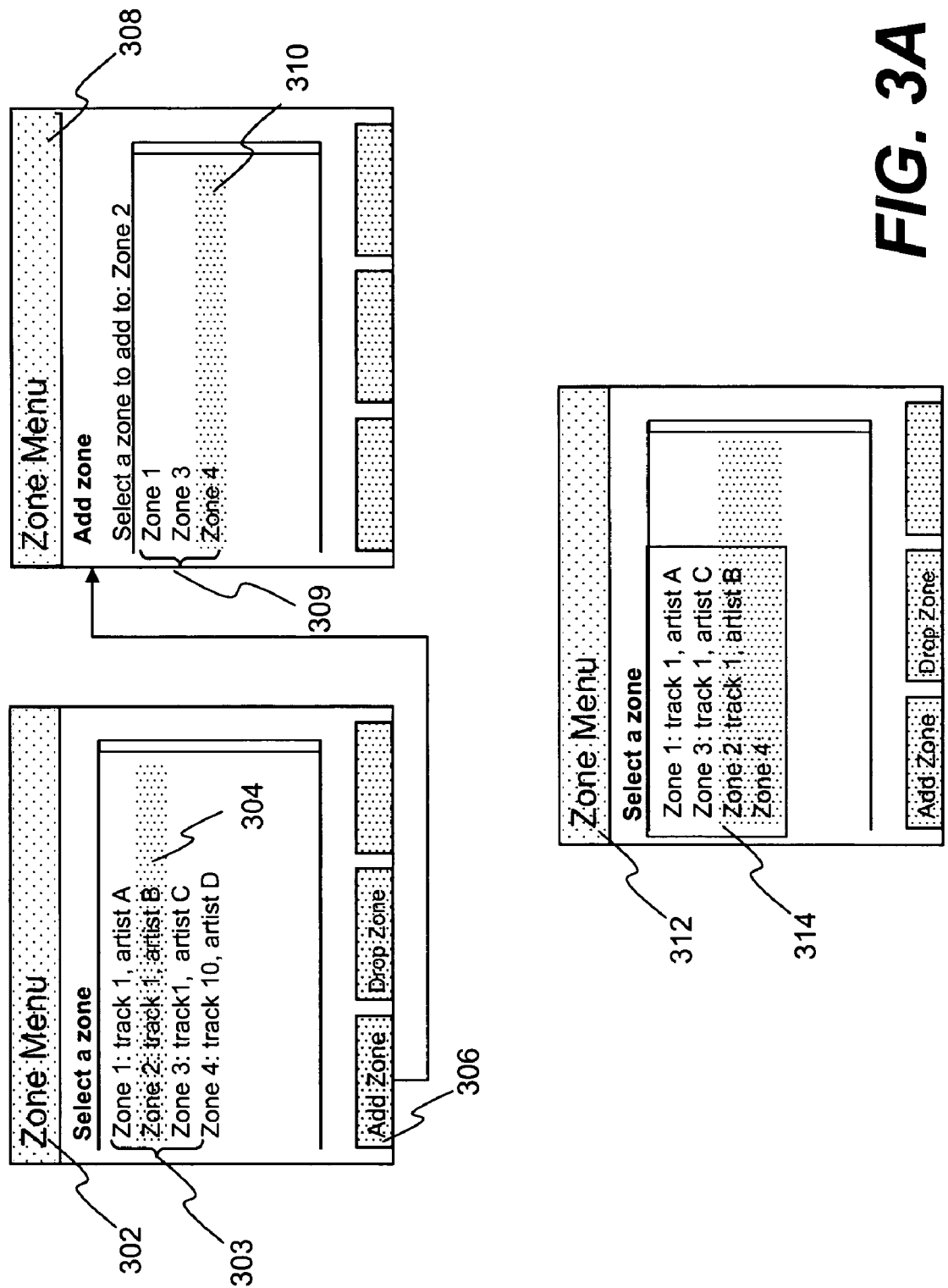
FIGS. 3A and 3B illustrate a sequence of screen displays in accordance with one embodiment of the present invention for controlling a plurality of players.
Figure 3B:
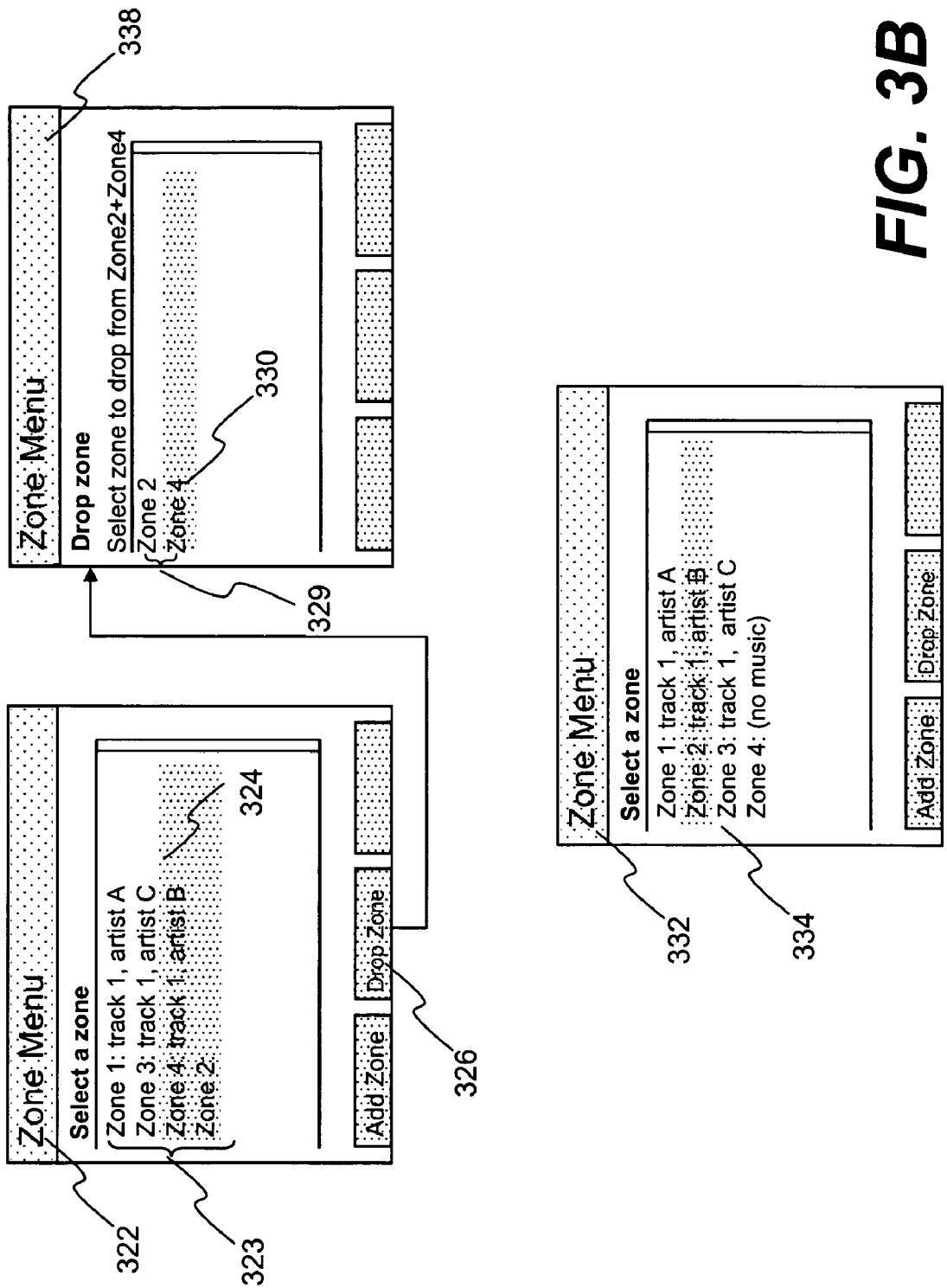

FIGS. 3A and 3B illustrate a sequence of screens in accordance with one embodiment of the present invention for manipulating a plurality of zone players for an exemplary four-zone distributed audio system. There are four zone players in four zones and referred to as: "Zone 1", "Zone 2", "Zone 3" and "Zone 4".

FIG. 3A shows a grouping process. A first "Zone Menu" 302 shows a first list 303 of available zone players. One of the zone players or existing zone group is selected as a zone group head 304, which is indicated with uniformly highlighted texts. It is noted the highlighted texts may also be expressed as grouped icons, concatenated texts or other representations of a current selection on the screen. The highlighted texts react to a user's scrolling selection (e.g., via a scroll wheel 250 of FIG. 2B). Also shown as one of the bottom labels on the first "Zone Menu" 302 is the "Link Zones" or "Add Zone" label 306 that corresponds to a soft button (e.g., soft button 266 of FIG. 2B). A scroll indicator is displayed beside the first display 302 when the number of items is too many to be accommodated in one display.

When the soft button corresponding to "Link Zones" or "Add Zone" 306 is activated, a second "Zone Menu" 308 is displayed. A second list shows eligible zone groups or zone players 309 for the zone group head 304. Since "Zone 2" has been selected as the zone group head to form a zone group, the eligible zone groups and zone players are now "Zone 1", "Zone 3" and "Zone 4". As shown in highlighted texts, the zone player (Zone 4) 310 is selected to be grouped with the zone group head (Zone 2) 304 to form a new zone group.

After the user confirms the selection, the newly formed zone group configuration is updated and the audio source can be played synchronously for all of the zone players in the newly formed zone group as shown in FIG. 3A. The first "Zone menu" 312 is displayed again with the newly formed zone group 314 as one of the choices along with other available zone players. Depending on implementation, any zone players that have been used in a group may or may not be used in another group. As shown in FIG. 3A, the zone players 2 and 4 are in a zone group started by the zone player 2, the zone player 4 (even the zone player 2) can be in another zone group, for example, while a player in a living room is grouped with a player in a dinning room, the same player in the living room can be grouped with a player in a family room.

In another embodiment, a display shows a list of available zone players for grouping. An interactive graphic interface allows a user to interactively select some of the available zone players that are automatically grouped. Anyone of the selected zone players in the group may be elected to be a group head such that other players in the group are synchronized to follow the group head.

According to one embodiment, the synchronization of all zone players in the new zone group is achieved with the following steps: 1) choosing an audio source from one of the zone players in the group, 2) checking if the chosen audio source is available locally on each of the zone players, 3) retrieving the audio source from another device (e.g., other zone players) which has the audio source via the data network, if the audio source is not available locally, and 4) playing the audio source on each of the zone players synchronously. In another embodiment, the audio source in the group or player to be added is chosen as default for other zone players. As shown in FIG. 3A, the audio source for "Zone 4" is track 10 with artist D. Accordingly, the zone player "Zone 2" will play track 10 with artist D synchronously with "Zone 4" after the new zone group is formed.

FIG. 3B shows a de-grouping process in reference to FIG. 3A.1. A first "Zone Menu" 322 shows a first list 323 of available zone players and zone groups, if there is any. One of the zone groups ("Zone 2+Zone 4") to be de-grouped is selected as shown in highlight texts 324. When the "Unlink Zones" or "Drop Zone" soft button 326 is activated, the second "Zone Menu" 328 displays a list 329 that shows all of the member zone players in the selected zone group. One of the zone players 330 (Zone 4) in the selected zone group is chosen to be disassociated from the zone group 324. When the de-grouping is confirmed by user, the "Zone Menu" 332 is presented to reflect the de-grouping of a zone group (e.g., "Zone 2") 334. When zone players are grouped together, all of the zone players play the same audio source synchronously. If a zone player is disassociated or dropped from the zone group, the remaining zone players in the zone group continue playing the audio source. In the "Zone Menu" 332, it shows the zone player (Zone 4) has no music 336 after the disassociation from the zone group, while the remaining player (Zone 2) continues to play the same music—track 10 with artist D.

Figure 3C:
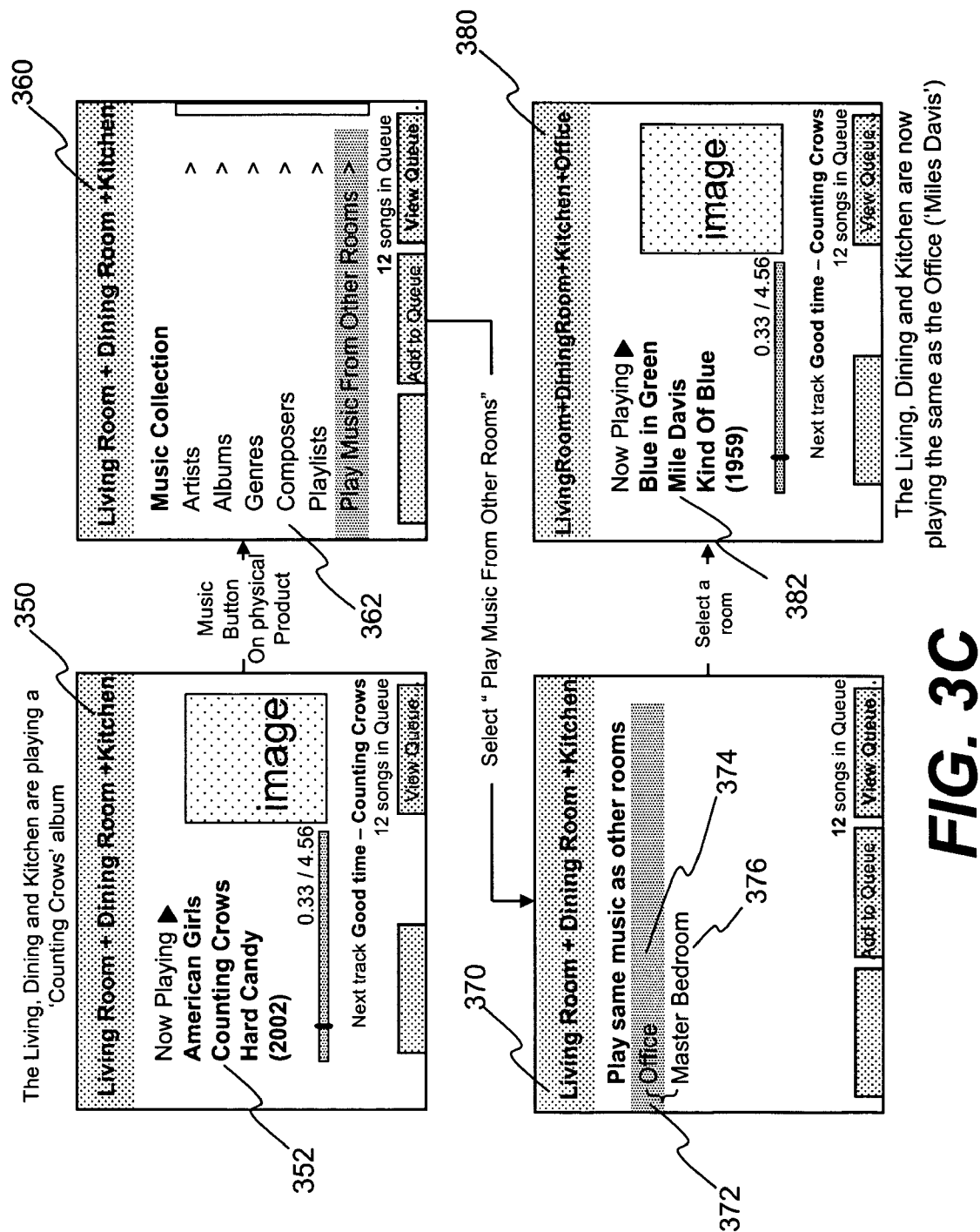
FIG. 3C shows a sequence of screen displays in accordance with one embodiment of the present invention for alternatively controlling players.

Referring now to FIG. 3C, there shows a sequence of screens depicting alternative steps of creating a zone group. An exemplary five-zone audio system is used to describe these alternative steps. There are five zone players located in a living room, a dining room, a kitchen, an office and a master bedroom. It is assumed that three of the five rooms, the living room, the dining room and the kitchen, are grouped to form a zone group called "LivingRoom+DiningRoom+Kitchen". The Screen display 350 shows that an audio source called "Counting Crows" 352 is being played on all the zone players in the group. When a user activates the "music" button 248 on a controller 240 of FIG. 2B, the screen display 360 shows a "Music Menu" page which shows a list of choices 362. One of the choices is "Play Music From Other Rooms" 364. When the user selects this option, the screen display 370 for "Play Same Music As Other Rooms" displays a list 372 of eligible rooms or zone players to be grouped with the current group "Living Room+Dining Room+Kitchen". In this example the eligible rooms are Office 374 and Master Bedroom 376. It is assumed that the "Office" 374 which is indicated with the highlighted bar is chosen. As a result, the zone player "Office" is grouped with the original zone group to become a new group called "LivingRoom+DiningRoom+Kitchen+Office" as shown in screen display 380. And the audio source "Miles Davis" 382 from the zone player "Office" is played synchronously on all zone players in the new group.

Referring now to FIGS. 4A and 4B, there is shown a sequence of screens in accordance with one embodiment of the present invention for controlling audio volume of zone players in a zone group. These screens are activated and displayed when one of the volume control buttons is activated. According to one embodiment, the volume control buttons are "mute" button 262 and "volume up/down" button 264 on the controller 240 of FIG. 2B.

FIG. 4A shows that the current active zone player is in a living room of a house. The "Volume" panel 410 is displayed for the current zone player "Living Room". A volume meter 412 is included to indicate a volume adjustment made by a user. A mute icon 414 is shown when the "mute" button is activated while the audio is on.

FIG. 4B shows that the current active zone group includes five rooms: living room, dining room, kitchen, den and study. A "Volume" panel 430 for the zone group is displayed for the convenience of a user. In the display, a plurality of volume meters 431 is shown. One of the volume meters is for the entire zone group 432. Other volume meters are for all the zone players in the group, one for each room or zone player. A scroll indicator is shown as a downward arrow 436 that indicates the screen is too small to hold all volume meters in one screen display. There are more hidden choices that can be viewed by scrolling down. The scrolling cursor 436 is highlighted (e.g., Den 434). As a user scrolls down the list of volume meters 431, the contents on "Volume" panel 440 includes the volume meter of the next zone player on the list (e.g., Study 444). Similarly, when the scroll indicator is an upward arrow 442, other hidden choices within the list can be viewed by scrolling up.

When a user adjusts the audio volume, only the highlighted zones or zone players are affected. If the highlighted selection is one zone player, the audio adjustment will only apply to that particular chosen player. If multiple zone players are selected, the adjustment applies to all of the chosen players similar to the volume adjustment to the group volume meter described below. The audio volume of all zone players in the zone group will be affected, if the highlighted selection is at the volume meter of the entire group 432. Any audio volume adjustment to the zone group applies to all of the zone players equally within the entire zone group. Depending on implementation, the relative difference of the audio volume among zone players in the group remains unchanged either in percentage or graphic strength.

Figure 5:
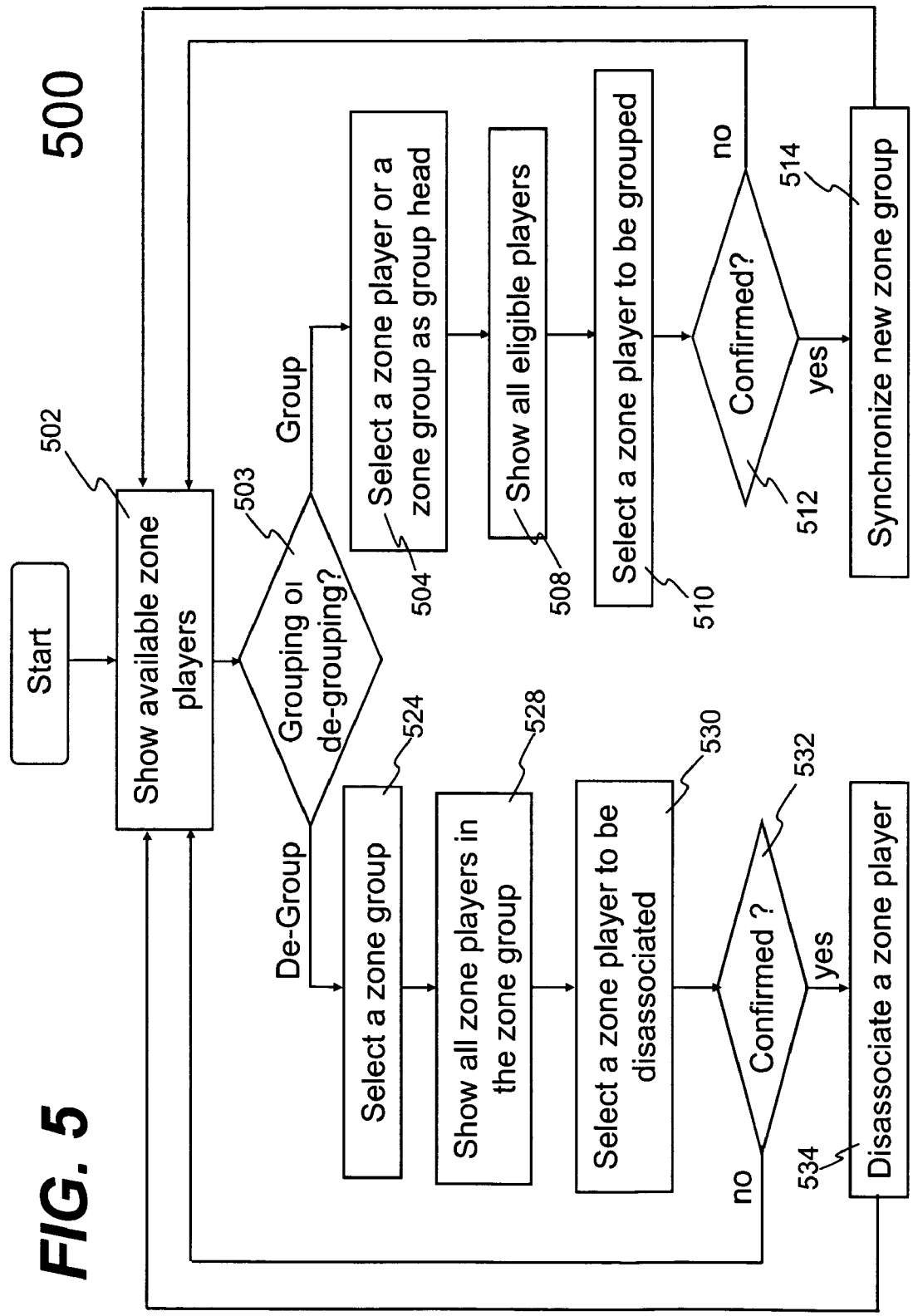
FIG. 5 shows a flowchart or process of controlling a plurality of zones players according to one embodiment of the present invention.

FIG. 5 shows a flowchart or process 500 of implementing one embodiment of the present invention for manipulating zone players. The process 500, which is preferably understood in conjunction with the previous figures especially with FIGS. 2B, 2C, 3A and 3B, may be implemented in software, hardware, or a combination of both. According to one embodiment, an application module implementing the process 500 is embedded in a controller, for example, the device 240 of FIG. 2C. The module may be loaded in the memory 282 to be executed by the microcontroller (processor) 276 and operating in conjunction with user input commands via the input interface 278.

The process 500 starts with a display at 502 showing a list of zone players or existing zone groups, if there are any. When the available zone players and zone groups in the list is too long to be presented on the display, a scroll indicator will be displayed beside the list. A user may access the hidden items within the list by scrolling either upward or downward. At 503, the process 500 splits into two branches based on the following tasks: 1) grouping a plurality of zone players to form a zone group, or 2) de-grouping a zone group.

If the process 500 performs the grouping task, the process moves onto 504. The user selects one of the zone players as a zone group head or the zone groups from the list. Once the selection is made and a key is activated (e.g., a soft button 306 as shown in FIG. 3A), a new list (e.g., screen 308 as shown in FIG. 3A) showing all of the zone players and zone groups that are eligible to be grouped with the selection at 504 is displayed at 508. In one embodiment as shown in FIG. 3A, when the zone player "Zone 2" is selected as the zone group head in a four-zone audio system, the eligible zone players are all other zone players ("Zone 1", "Zone 3" and "Zone 4") except for the zone player "Zone 2". At 510, the end user is then given the option to select one or more of the eligible zone players (e.g., "Zone 4" in FIG. 3A) or one of the eligible zone groups to be grouped into the selection at 504.

At 512, the user has the option to confirm to accept or to discard the selection made at 510. When a confirmation is made, the process 500 creates the zone group by synchronizing all of the zone players in the zone group at 514. In one embodiment, the synchronization is performed first to determine the audio source in the selected player to be grouped (e.g., Zone 4 in FIG. 3A). Then the audio source is transmitted to all other zone players in the same zone group before playing the audio source synchronously. In the meantime, this newly formed zone group configuration is updated. For example, the zone group configuration is saved to the memory 206 on the zone player 200 of FIG. 2A via the wireless communication. After the zone player in the newly formed zone group has been synchronized, the process 500 moves back to 502. An updated list of available zone players and zone groups is displayed. As an example shown in "Zone Menu" 312 of FIG. 3A, the newly formed zone group is listed as one of the items.

Going back to 512, if the selection made at 510 can not be confirmed or is to be discarded, the process 500 goes back to 502 without updating any zone group configuration. In this case, the original list is intact (e.g., "Zone Menu" 302 of FIG. 3A).

Going back to the grouping task test at 503, when the process 500 performs the de-grouping task, the process 500 moves to 524. A user selects one zone group from the first list. Once the selection is made, a list (e.g., screen 328 as shown in FIG. 3B) showing all of the zone players in the selected zone group is displayed at 528. In one embodiment as shown in FIG. 3B, "Zone 2+Zone 4" is the selected zone group, the zone players in the selected zone group are "Zone 2" and "Zone 4". At 530, the end user selects one or more of the zone players (e.g., Zone 4) from the list to be disassociated from the zone group. At 532, the user has the option to confirm or to discard the selection made at 530.

When the selection is confirmed, the process 500 updates the selected zone group by disassociating the zone player from the zone group at 534. As a result of the disassociation, the audio source being played in the zone group is no longer available to the disassociated zone player. In the meantime, the updated zone group configuration is saved. For example, the zone configuration is saved to the memory 206 on the zone player 200 (FIG. 2A). After the zone player has been disassociated, the process 500 moves back to 502. The list of available zone players and zone groups is displayed. This time the newly updated zone group is listed as one of the items (e.g., "Zone Menu" 332 of FIG. 3B).

Going back to 532, if the selection made at 530 is to be discarded, the process 500 moves back to 502 directly without updating the zone group configuration. In this case, the original list is presented (e.g., "Zone Menu" 322 of FIG. 3B).

Figure 6:
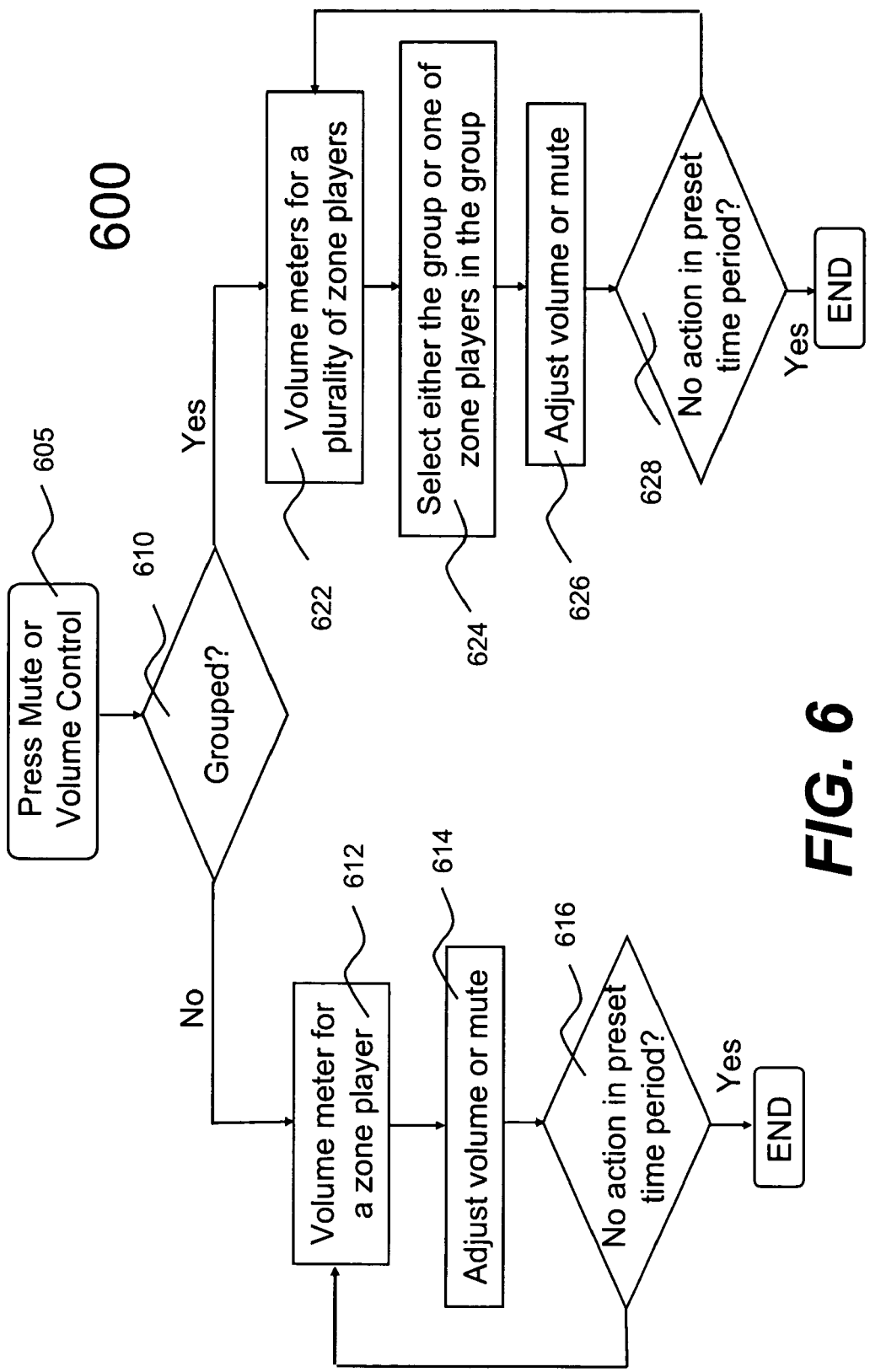
FIG. 6 shows a flowchart or process of controlling audio volume of a plurality of players in a zone group according to one embodiment of the present invention.

Referring now to FIG. 6, there is shown a flowchart or process 600 of controlling audio volume of a plurality of zone players in a zone group. The process 600, which is preferably understood in conjunction with the previous figures especially with FIGS. 2B, 2C, 4A and 4B, may be implemented in software, hardware, or a combination of both. According to one embodiment, an application module implementing the process 600 is embedded in a controller, for example, the device 240 of FIG. 2C. The module may be loaded in the memory 282 to be executed by the microcontroller (processor) 276 and operating in conjunction with user input commands. In one embodiment, the module is configured to control the audio volume of a group of zone players. It should be noted that zone group and a group of zone players are used interchangeably in the description for FIG. 6.

At 605, the process 600 starts when one of the volume control buttons, for example, "mute" button 262 or "volume up/down" button 264, on the controller 240 of FIG. 2B, is activated. The process 600 splits into two branches depending on whether a single zone player or a group of zone players is to be controlled at 610.

If it is for a single zone player, a volume meter (e.g., "Volume" panel 410 in FIG. 4A) is presented at 612. At 614, the end user has option to adjust the volume for the zone player with one of the volume control buttons. The volume control signals are sent from the controller 240 (FIG. 2C) to the zone player 200 (FIG. 2A). In one embodiment, the volume panel displays a moving volume meter showing an increasing or decreasing bar as the audio volume of the selected zone player is adjusted up or down. In another embodiment, the mute icon is shown instead of a volume meter, when the "mute" button is activated while the audio is on.

At 616, the process 600 is waiting for a user's command. If a predetermined amount of time (e.g., 1 second) has lapsed, the process 600 ends, which means the user is not going to change the volume. Otherwise, the process 600 goes back to 612 waiting for another action from the end user.

Referring back to 610, if process 600 is for a group of zone players, then the process 600 moves to the zone group branch at 622, in which a plurality of volume meters is presented. The plurality of volume meters includes one for each of the zone players in the zone group, plus one more for the entire zone group. In one embodiment as shown in FIG. 4B, a "Volume" panel 430 for a plurality of zone players in a zone group is presented. When the screen is too small to display all the zone players, a scroll indicator is displayed beside the list of the volume meters to indicate that there are hidden volume meters. At 624, the user selects one of the volume meters. At 626, the audio volume is adjusted with one of the volume control buttons. When the volume adjustment is made to one of the zone players, only the selected zone player is affected. The audio volume of the rest of the zone players remains unchanged. However, when the volume adjustment is made to the zone group, the entire group will respond to the volume adjustment in an identical scale. In one embodiment, the identical scale is based on percentage of the audio volume. In another embodiment, the identical scale is based on graphic representation of the volume meter.

In one embodiment, an end user increases the audio volume for the zone group by 5%. The volume for each of the zone players in the zone group will be increased by 5%, and the relative volume loudness difference among each of the zone players remains unchanged. In another embodiment, if a user had muted one of the zone players of the zone group, the volume of all other zone players would have been unchanged.

The group audio volume is calculated based on a predetermined formula. In one embodiment, the group audio volume is the averaged value of the audio volume of all the zone players within the zone group. In another embodiment, the median value may be chosen as the group audio volume. The user uses a scrolling device (e.g., scroll wheel 250 of FIG. 2B) to select a zone player or the entire zone group and then adjust the volume with one of the volume control buttons.

At 628, the process 600 is waiting for a user's command. If a predetermined amount of time has lapsed, the process 600 ends, which means the user is not going to change the volume of the zone group. Otherwise, the process 600 goes back to 622 waiting for another action from the end user.

Figure 7A:
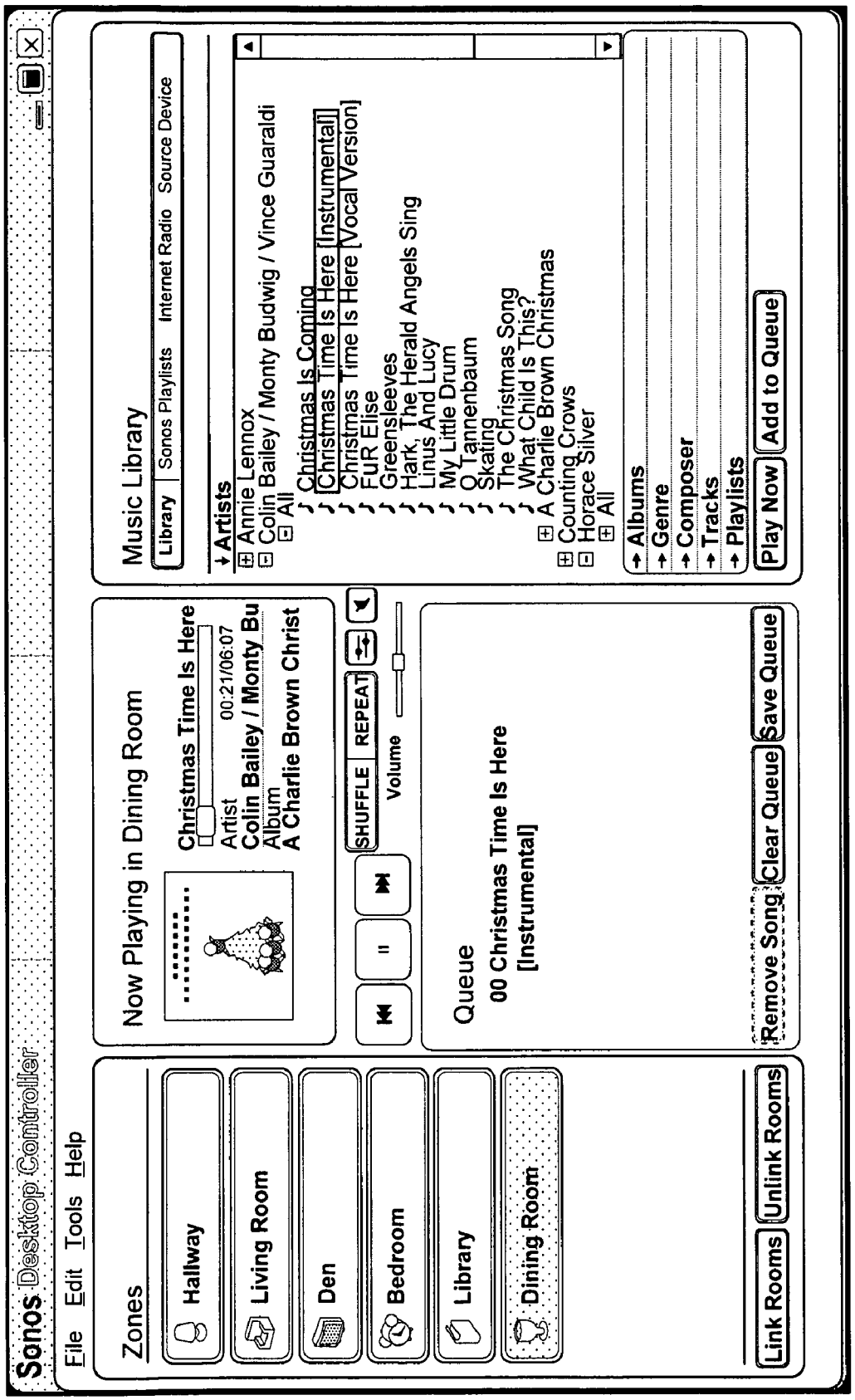
FIGS. 7A-7D show a sequence of screen displays in accordance with one embodiment of the present invention on a computing device for alternatively controlling players.
Figure 7B:
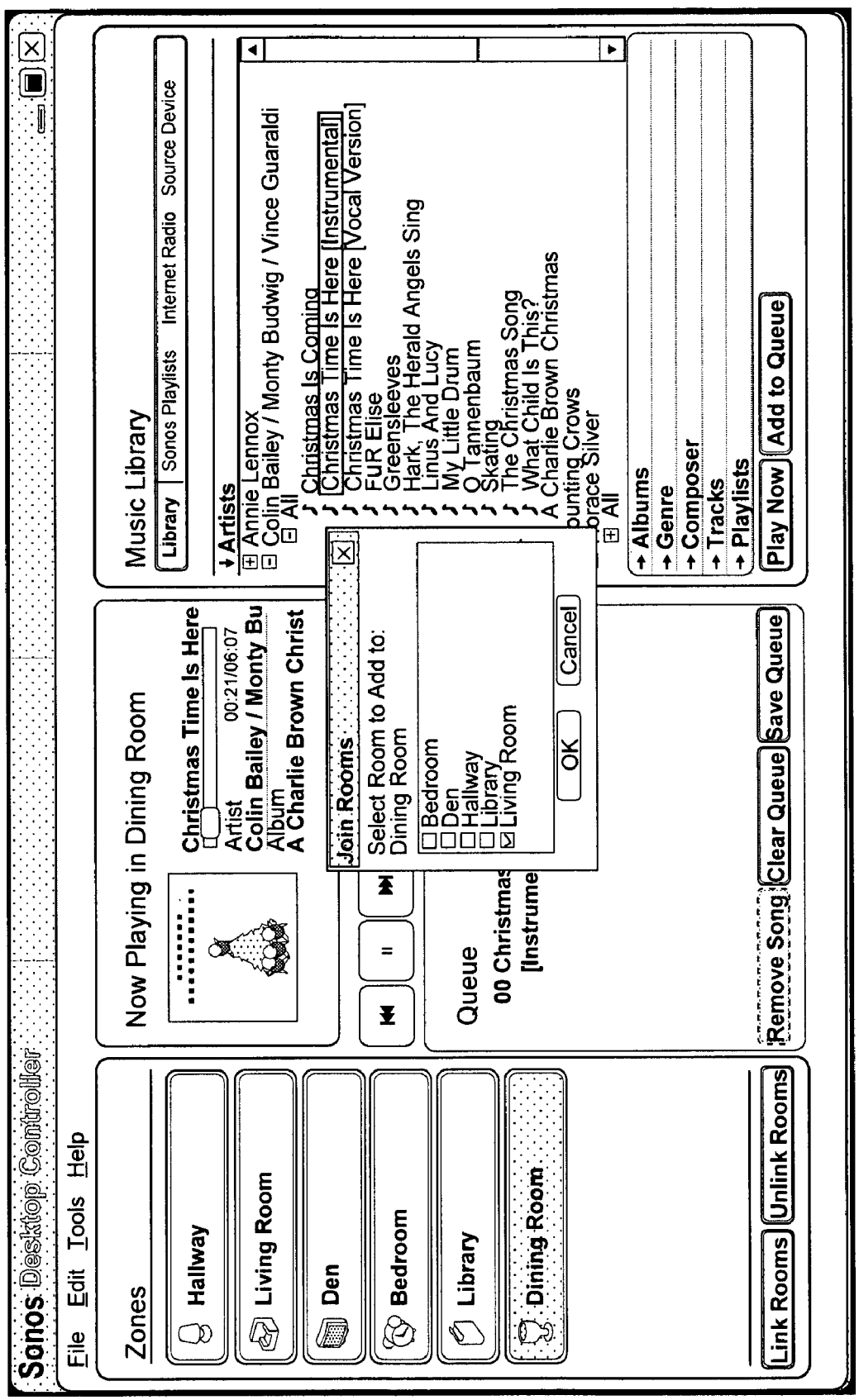
Figure 7C:
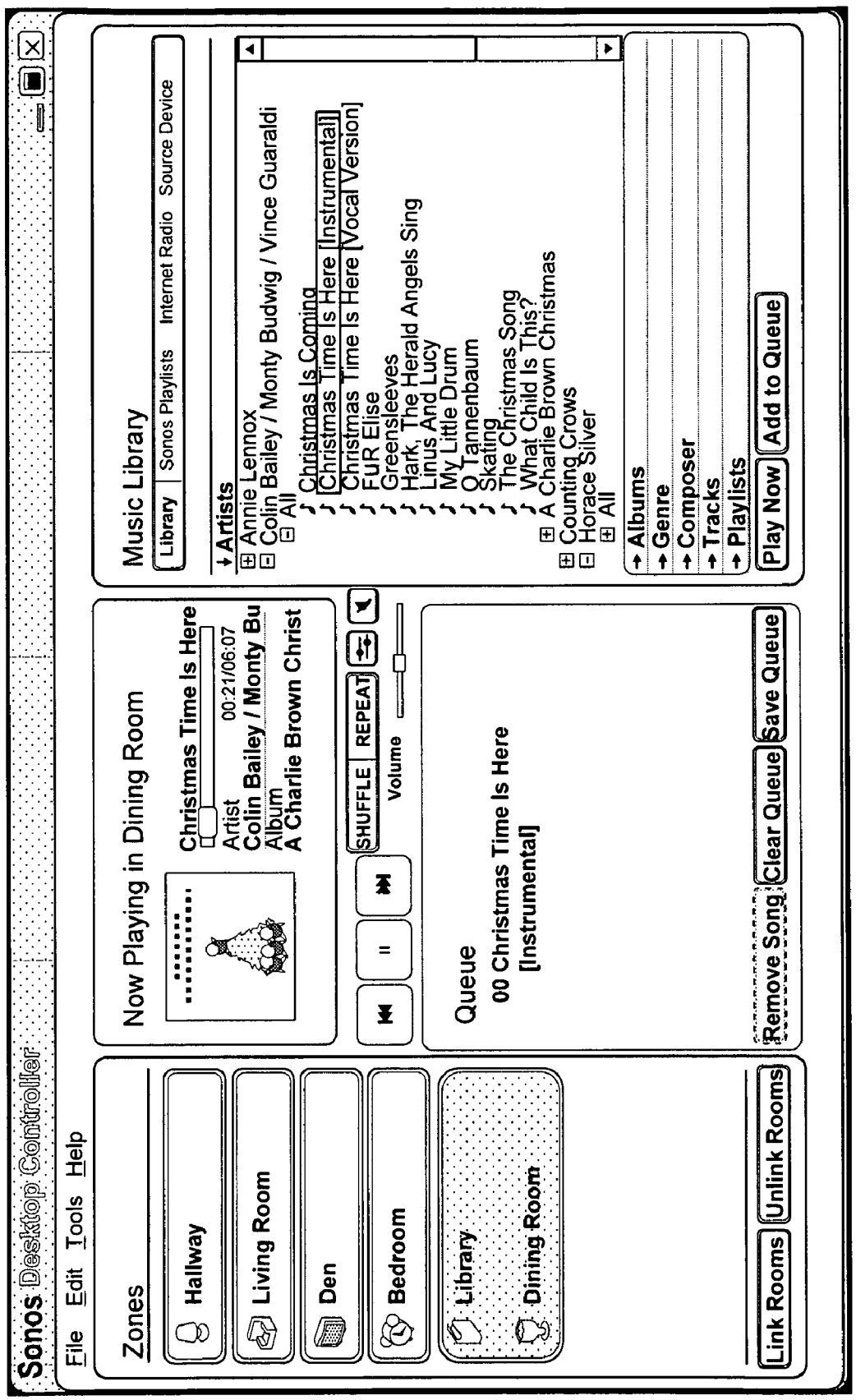
Figure 7D:
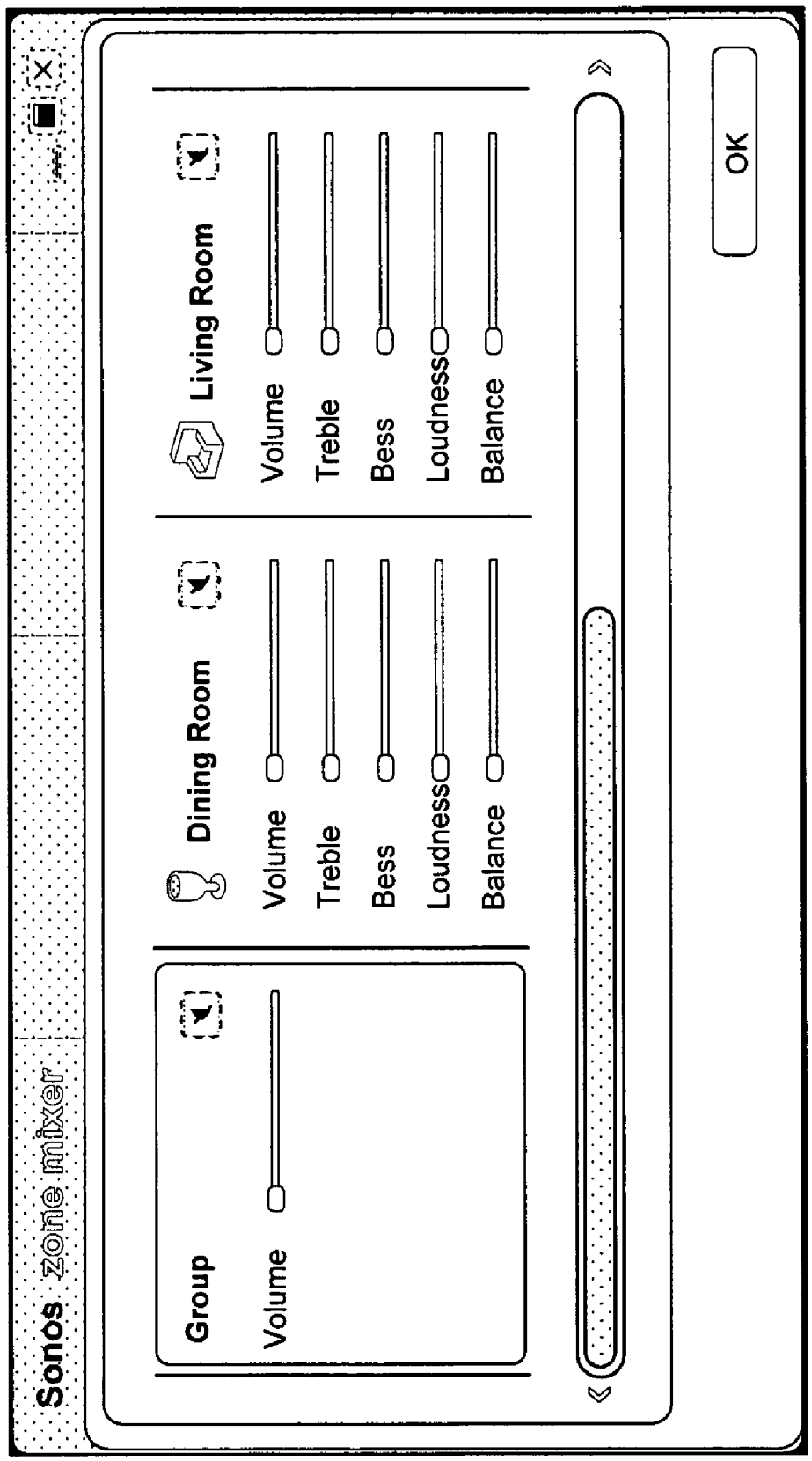

FIGS. 7A-7D are a series of screenshots according to one embodiment of the present invention on a computing device on a network. The computing device may correspond to the device 110 of FIG. 1 and be configured to control operations of the zone players installed in a complex. With a larger screen of the computing device than that of a portable controller, the graphic user interface on the larger screen appears different from that, for example, shown in FIGS. 3A-4B, the underlying principle nevertheless does not depart from the above description for the portable controller. A user is able to control any one or all of the zone players from the computing device. FIG. 7A shows all individual available zone players with the one in the Dining Room being selected to play a track entitled "A Charlie Brown Christmas". FIG. 7B shows a pop-up window listing remaining available players to be grouped with the one in the Dining Room. Depending on a desirable group, the user can select from the remaining available players to be grouped with the one in the Dining Room to form a zone group. FIG. 7C shows, as a result, the players in the Dining Room and the living room are in one group and play synchronously a song entitled "Christmas time is here". FIG. 7D shows the control of some exemplary acoustic characteristics of the zone players in a group with the volume being controlled.

The present invention can be implemented in many ways, each of which may yield one or more of the following benefits, advantages or features. One of them is a mechanism provided to enable a user to remotely control audio characteristics of the zone players either as a group or as an individual player. Second, an interactive graphic user interface is provided to enable a user to manage, create, delete or modify zone groups. Another one of the benefits, advantages or features is to provide a user interface to facilitate a user to control audio characteristics of an individual zone player or a group of zone players. Other benefits, advantages or features can be appreciated by those skilled in the art given the detailed description herein.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. For example, the present invention can be implemented in a multi-zone multimedia system providing other than audio entertainment. Accordingly, the scope of the present invention is defined by the appended claims rather than the forgoing description of embodiments.

We claim:

1. A method for controlling a plurality of players, the method comprising:
   displaying on a screen a first list showing at least available players;
   displaying, when at least one of the players is selected as a zone group head, on the screen a second list showing at least some of the players that are eligible to be grouped with the zone group head;
   forming a zone group started with the zone group head, after one or more players from the at least some of the players are selected to join the zone group; and
   synchronizing all players in the zone group;

adjusting a volume meter represented by an averaged value of audio volumes of the slayers in the group, wherein said adjusting of the volume meter includes changing a volume of each of the group of slayers synchronously in accordance with an adjustment made by a user.

2. The method of claim 1, wherein the first list becomes scrollable, when the available players do not fit in the screen.

3. The method of claim 1, wherein said synchronizing all players in the zone group comprises:
determining an audio source for the zone group;
making the audio source available to each of the players in the zone group; and
playing the audio source synchronously in all players in the zone group.

4. The method of claim 3, wherein said determining an audio source for the zone comprises selecting the audio source being played or ready to be played by the zone group head.

5. The method of claim 3, wherein said of determining an audio source for the zone comprises selecting the audio source being played or ready to be played by one of the players in the zone group.

6. The method of claim 3, wherein said making of the audio source available comprises:
determining whether the audio source is available locally; and
retrieving the audio source from a device on a network, if the audio source is not available locally.

7. The method of claim 6, wherein said making of the audio source available comprises:
determining the audio source from one of the players in the zone group; and
causing the audio source available to every other player in the zone group.

8. The method of claim 1, wherein said synchronizing of all players in the zone group comprises:
causing all players in the zone group to play an identical audio source; and
presenting the zone group in a manner that indicates a grouping.

9. The method of claim 8, wherein the manner includes one or more of highlighting, colors, explicit texts and graphs.

10. The method of claim 1, wherein the first list further shows at least one zone group.

11. The method of claim 10, wherein the zone group includes at least two players.

12. The method of claim 9, wherein a configuration of the zone group is stored in at least one of the players or a controller for remotely controlling one or more of the players, the configuration including information on how the two players are grouped.

13. The method of claim 8, further including:
selecting the zone group to be de-grouped from the first list;
displaying on the screen another list showing all the players within the zone group to be de-grouped;
selecting one or more players from the another list; and
disassociating the selected players from the zone group.

14. The method of claim 13, wherein said disassociating the selected players comprises making the selected players available for grouping with a zone group.

15. The method of claim 13, wherein the another list becomes scrollable, when all the players within the zone group to be de-grouped do not fit in the screen.

16. A method for controlling a plurality of players, the method comprising:
displaying on a screen a list showing a plurality of volume meters, at least one of the volume meters representing an audio volume of one of the players, and another one of the volume meters representing an audio volume of a group of players, when there is such a group; and
adjusting one of the volume meters as desired after one of the volume meters from the list is selected, wherein the one of the volume meters is for the group of players, represented by an averaged value of audio volumes of the players in the group, and said adjusting of the one of the volume meters includes
changing a volume of each of the group of slayers synchronously in accordance with an adjustment made by a user.

17. The method of claim 16, wherein said adjusting the one of the volume meters includes:
causing the audio volume to be adjusted in accordance with an adjustment to the volume meter; or
causing the audio volume to be off, when a mute button is activated while the audio volume is on; and
causing the audio volume to be on, when a mute button is activated while the audio volume is off.

18. The method of claim 16, further comprising adjusting the one of the volume meters for the group of players in a predetermined manner that appears that the group of players are being adjusted at the same time.

19. The method of claim 16, further comprising maintaining relative volume loudness difference among each of the players in the group.

20. The method of claim 16, further comprising playing an identical audio source in the group of players.

21. The method of claim 20, wherein the audio source is retrieved in form of audio data packets over the network.

22. The method of claim 21, wherein at least part of the audio source is retrieved or being streamed from one of the players.

23. The method of claim 16, wherein the one of the volume meters from the list selected is for the group of players, and wherein said adjusting the one of the volume meters includes causing an equal change to a volume of each of the players in the group.

24. The method of claim 16, wherein the one of the volume meters from the list selected is for the group of players, and wherein said adjusting the one of the volume meters includes causing a predetermined unit change in volume for ever action by a user.

25. An apparatus for controlling a plurality of players, the apparatus comprising:
a screen;
a screen driver commanding the screen;
an input interface;
a network interface;
a memory for storing code for an application module;
a processor coupled to the memory, the input interface, the screen driver and the network interface, the processor executing the code in the memory to cause the application module and the screen driver to perform operations of:
displaying on a screen a first list showing at least available players;
displaying a zone group including players from the available players when at least two of the available players are selected to form the zone group, wherein any one of the players in the group serves as a zone group head;
synchronizing all players in the zone group in accordance with the zone group head; and
adjusting a volume meter represented by an averaged value of audio volumes of the slayers in the group, wherein said adjusting of the volume meter includes changing a volume of each of the group of players synchronously in accordance with an adjustment made by a user.

26. The apparatus of claim 25, wherein the first list becomes scrollable, when the available players do not fit in the screen.

27. The apparatus of claim 25, wherein said synchronizing all players in the zone group comprises:
   determining an audio source for the zone group;
   making the audio source available to each of the players in the zone group; and
   playing the audio source synchronously in all players in the zone group.

28. The apparatus of claim 27, wherein said determining an audio source for the zone comprises selecting the audio source being played or ready to be played by the zone group head.

29. The apparatus of claim 27, wherein said determining an audio source for the zone comprises selecting the audio source being played or ready to be played by one of the players in the zone group.

30. The apparatus of claim 27, wherein said making the audio source available comprises:
   determining whether the audio source is available locally; and
   retrieving the audio source from a device on a network, if the audio source is not available locally.

31. The apparatus of claim 27, wherein said making the audio source available comprises:
   determining the audio source from one of the players in the zone group; and
   causing the audio source available to every other player in the zone group.

32. The apparatus of claim 25, wherein said synchronizing all players in the zone group comprises:
   causing all players in the zone group to play an identical audio source; and
   presenting the zone group in a manner that indicates a grouping.

33. The apparatus of claim 32, wherein the manner includes one or more of highlighting, colors, explicit texts and graphs in the screen.

34. The apparatus of claim 25, wherein the first list further shows at least one zone group.

35. The apparatus of claim 25, wherein the processor executing the code in the memory to cause the application module and the screen driver to perform operations of:
   selecting the zone group to be de-grouped from the first list;
   displaying on the screen an another list showing all the players within the zone group to be de-grouped;
   selecting one or more players from the another list; and
   disassociating the selected players from the zone group.

36. The apparatus of claim 35, wherein said disassociating the selected players comprises making the selected players available for grouping with a zone group.

37. The apparatus of claim 35, wherein the another list becomes scrollable, when all the players within the zone group to be de-grouped do not fit in the screen.

38. An apparatus for manipulating a plurality of players, the apparatus comprising:
   a screen;
   a screen driver commanding the screen;
   an input interface;
   a network interface;
   a memory for storing code for an application module;
   a processor coupled to the memory, the input interface, the screen driver and the network interface, the processor executing the code in the memory to cause the application module and the screen driver to perform operations of:
      displaying on a screen a list showing a plurality of volume meters, at least one of the volume meters representing an audio volume of one of the players, and another one of the volume meters representing an audio volume of a group of players, if there is such a group; and
      adjusting one of the volume meters as desired after one of the volume meters from the list is selected, wherein the one of the volume meters is for the group of players, represented by an averaged value of audio volumes of the slayers in the group, and said adjusting of the one of the volume meters includes changing a volume of each of the group of players synchronously in accordance with an adjustment made by a user.

39. The apparatus of claim 38, wherein said adjusting the one of the volume meters includes:
   causing the audio volume to be adjusted in accordance with an adjustment to the volume meter; or
   causing the audio volume to be off, when a mute button is activated while the audio volume is on; and
   causing the audio volume to be on, when a mute button is activated while the audio volume is off.

40. The apparatus of claim 38, wherein the one of the volume meters from the list selected is for the group of players, and wherein said adjusting the one of the volume meters includes:
   changing a volume of each of the group of players synchronously in accordance with an adjustment made by a user.

41. The apparatus of claim 38, wherein the processor executing the code in the memory causes the application module and the screen driver to perform operations of adjusting the one of the volume meters for the group of players in a predetermined manner that appears that the group of players are being adjusted at the same time.

42. The apparatus of claim 38, wherein the processor executing the code in the memory causes the application module and the screen driver to perform operations of maintaining relative volume loudness difference among each of the players in the group.

43. The apparatus of claim 38, wherein the one of the volume meters from the list selected is for the group of players, and wherein said adjusting the one of the volume meters includes causing an equal change to a volume of each of the players in the group.

44. The apparatus of claim 38, wherein the one of the volume meters from the list selected is for the group of players, and wherein said adjusting the one of the volume meters includes causing a predetermined unit change in volume for ever action by a user.

* * * * *

UNITED STATES PATENT AND TRADEMARK OFFICE
CERTIFICATE OF CORRECTION

| | | |
|---|---|---|
| PATENT NO. | : 7,571,014 B1 | Page 1 of 1 |
| APPLICATION NO. | : 10/861653 | |
| DATED | : August 4, 2009 | |
| INVENTOR(S) | : Robert A. Lambourne and Nicholas A. J. Millington | |

It is certified that error appears in the above-identified patent and that said Letters Patent is hereby corrected as shown below:

In the claims:

Claim 1, column 15, line 2, delete "slayers" and replace with --players--

Claim 16, column 16, line 10, delete "slayers" and replace with --players--

Claim 24, column 16, line 42, delete "ever" and replace with --every--

Claim 25, column 16, line 66, delete "slayers" and replace with --players--

Claim 38, column 18, line 21, delete "slayers" and replace with --players--

Claim 44, column 18, line 59, delete "ever" and replace with --every--

Signed and Sealed this
Nineteenth Day of March, 2013

Teresa Stanek Rea
*Acting Director of the United States Patent and Trademark Office*